United States Patent
Lavender et al.

(10) Patent No.: US 10,742,419 B2
(45) Date of Patent: Aug. 11, 2020

(54) VALIDATION CRYPTOGRAM FOR TRANSACTION

(71) Applicant: VISA INTERNATIONAL SERVICE ASSOCIATION

(72) Inventors: Phillip Lavender, Foster City, CA (US); Vikram Modi, Lafayette, CA (US); Glenn Leon Powell, Fremont, CA (US)

(73) Assignee: VISA INTERNATIONAL SERVICE ASSOCIATION, San Francisco, CA (US)

( * ) Notice: Subject to any disclaimer, the term of this patent is extended or adjusted under 35 U.S.C. 154(b) by 144 days.

(21) Appl. No.: 15/456,288

(22) Filed: Mar. 10, 2017

(65) Prior Publication Data
US 2017/0272253 A1  Sep. 21, 2017

Related U.S. Application Data

(60) Provisional application No. 62/308,788, filed on Mar. 15, 2016.

(51) Int. Cl.
  *H04L 9/32* (2006.01)
  *H04L 29/06* (2006.01)
  (Continued)

(52) U.S. Cl.
  CPC .......... *H04L 9/3247* (2013.01); *H04L 9/0618* (2013.01); *H04L 9/14* (2013.01);
  (Continued)

(58) Field of Classification Search
  CPC ..... H04L 9/3247; H04L 63/0428; H04L 9/14; H04L 9/30; H04L 9/0618
  (Continued)

(56) References Cited

U.S. PATENT DOCUMENTS 5,671,279 A * 9/1997 Elgamal ................. G06Q 20/02
                                                380/29
5,765,176 A * 6/1998 Bloomberg ............. G06T 11/00
                                                345/634
(Continued)

FOREIGN PATENT DOCUMENTS

EP   2 738 724    6/2014
WO   02059847    8/2002

OTHER PUBLICATIONS

PCT/US2017/021939, "International Search Report and Written Opinion", dated Jun. 22, 2017, 13 pages.
(Continued)

*Primary Examiner* — Saleh Najjar
*Assistant Examiner* — Peiliang Pan
(74) *Attorney, Agent, or Firm* — Kilpatrick Townsend & Stockton LLP

(57) ABSTRACT

A method for validating an interaction is disclosed. A first interaction cryptogram can be generated by a first device using information about a first party to the interaction and a second party to the interaction. A second interaction cryptogram can be generated by a second device also using information about the first party to the interaction and the second party to the interaction. Verifying each cryptogram can validate that the interaction details have not been changed, and that both the first party and second party legitimately authorized the interaction.

16 Claims, 5 Drawing Sheets

(51) Int. Cl.
  *H04L 9/06* (2006.01)
  *H04L 9/14* (2006.01)
  *H04L 9/30* (2006.01)
(52) U.S. Cl.
  CPC ............ *H04L 9/30* (2013.01); *H04L 63/0428* (2013.01); *H04L 63/12* (2013.01); *H04L 2209/56* (2013.01); *H04L 2463/102* (2013.01)
(58) Field of Classification Search
  USPC .......................................................... 713/176
  See application file for complete search history.

(56) References Cited

U.S. PATENT DOCUMENTS

| | | | | |
|---|---|---|---|---|
| 5,812,669 | A * | 9/1998 | Jenkins | G06Q 20/401 380/30 |
| 6,170,058 | B1 * | 1/2001 | Kausik | G06F 21/6245 713/193 |
| 6,629,081 | B1 * | 9/2003 | Cornelius | G06Q 20/04 705/30 |
| 6,836,765 | B1 * | 12/2004 | Sussman | G06Q 20/02 705/75 |
| 7,024,562 | B1 * | 4/2006 | Flink | H04L 9/3231 713/176 |
| 7,124,101 | B1 * | 10/2006 | Mikurak | G06Q 10/06 705/35 |
| 7,386,728 | B1 * | 6/2008 | Lang | H04L 9/3247 380/277 |
| 8,851,366 | B2 | 10/2014 | Modi | |
| 8,892,462 | B1 * | 11/2014 | Borovsky | G06Q 20/204 705/17 |
| 9,317,849 | B2 * | 4/2016 | Pitroda | G06Q 20/02 |
| 9,559,849 | B1 * | 1/2017 | Wasiq | H04L 9/3247 |
| 9,684,597 | B1 * | 6/2017 | Eiriksson | G06F 12/082 |
| 2001/0037464 | A1 * | 11/2001 | Persels | H04L 51/30 726/5 |
| 2002/0029200 | A1 * | 3/2002 | Dulin | G06F 21/33 705/67 |
| 2002/0129236 | A1 * | 9/2002 | Nuutinen | H04L 63/0428 713/151 |
| 2002/0138445 | A1 * | 9/2002 | Laage | G06Q 20/02 705/67 |
| 2002/0141575 | A1 * | 10/2002 | Hird | G06F 21/62 380/44 |
| 2003/0021417 | A1 * | 1/2003 | Vasic | G06F 21/6245 380/277 |
| 2003/0028484 | A1 * | 2/2003 | Boylan | G06Q 20/02 705/40 |
| 2003/0084003 | A1 * | 5/2003 | Pinkas | G06Q 20/3829 705/71 |
| 2003/0163704 | A1 * | 8/2003 | Dick | H04L 63/0428 713/178 |
| 2004/0098350 | A1 * | 5/2004 | Labrou | G06Q 20/02 705/64 |
| 2004/0107170 | A1 * | 6/2004 | Labrou | G06Q 20/02 705/64 |
| 2004/0236819 | A1 * | 11/2004 | Anati | G06F 21/445 709/200 |
| 2005/0027543 | A1 * | 2/2005 | Labrou | G06Q 20/02 705/26.35 |
| 2005/0234908 | A1 * | 10/2005 | Lowrance | G06F 21/6227 |
| 2006/0090085 | A1 * | 4/2006 | McKenney | G06F 21/86 713/193 |
| 2006/0178918 | A1 * | 8/2006 | Mikurak | G06Q 10/06 705/7.25 |
| 2006/0212520 | A1 * | 9/2006 | Logue | H04L 51/12 709/206 |
| 2006/0248016 | A1 * | 11/2006 | Ginter | G06F 21/00 705/54 |
| 2007/0125838 | A1 | 6/2007 | Law et al. | |
| 2007/0125840 | A1 * | 6/2007 | Law | G06Q 20/10 235/379 |
| 2007/0130462 | A1 * | 6/2007 | Law | H04L 63/045 713/168 |
| 2007/0136817 | A1 * | 6/2007 | Nguyen | G06F 21/10 726/26 |
| 2007/0198432 | A1 * | 8/2007 | Pitroda | G06Q 20/02 705/64 |
| 2007/0228148 | A1 | 10/2007 | Rable | |
| 2007/0255653 | A1 | 11/2007 | Tumminaro et al. | |
| 2008/0031458 | A1 * | 2/2008 | Raja | H04L 9/30 380/279 |
| 2008/0183992 | A1 * | 7/2008 | Martin | G06F 11/1469 711/162 |
| 2008/0189186 | A1 | 8/2008 | Choi et al. | |
| 2009/0049297 | A1 * | 2/2009 | Omernick | H04L 9/3242 713/168 |
| 2009/0089584 | A1 * | 4/2009 | Bender | H04L 9/3236 713/176 |
| 2009/0125429 | A1 * | 5/2009 | Takayama | G06Q 20/04 705/35 |
| 2009/0177894 | A1 * | 7/2009 | Orsini | G06F 21/6209 713/193 |
| 2010/0005146 | A1 * | 1/2010 | Drako | G06Q 10/00 709/206 |
| 2011/0085667 | A1 * | 4/2011 | Berrios | G06F 21/445 380/282 |
| 2011/0173434 | A1 * | 7/2011 | Buckley | H04L 65/1016 713/150 |
| 2011/0219231 | A1 * | 9/2011 | Shen | H04L 63/06 713/168 |
| 2011/0296193 | A1 * | 12/2011 | Alghathbar | H04L 9/0643 713/181 |
| 2012/0066498 | A1 * | 3/2012 | Engert | G06F 21/51 713/170 |
| 2012/0204032 | A1 * | 8/2012 | Wilkins | H04L 9/006 713/170 |
| 2012/0284506 | A1 * | 11/2012 | Kravitz | G06Q 40/00 713/151 |
| 2013/0132283 | A1 | 5/2013 | Hayhow et al. | |
| 2013/0282589 | A1 * | 10/2013 | Shoup | G06F 21/34 705/67 |
| 2013/0291082 | A1 * | 10/2013 | Giladi | H04L 63/123 726/7 |
| 2013/0307670 | A1 * | 11/2013 | Ramaci | G06F 21/6245 340/5.82 |
| 2013/0326224 | A1 * | 12/2013 | Yavuz | H04L 9/3247 713/176 |
| 2014/0089205 | A1 | 3/2014 | Kapur et al. | |
| 2014/0207680 | A1 * | 7/2014 | Rephlo | G06Q 20/322 705/44 |
| 2014/0279546 | A1 * | 9/2014 | Poole | H04B 5/0031 705/44 |
| 2014/0379584 | A1 * | 12/2014 | Ward | G06Q 20/3829 705/71 |
| 2015/0161586 | A1 * | 6/2015 | Bailey | G06Q 20/3224 705/44 |
| 2016/0019533 | A1 | 1/2016 | Wu et al. | |
| 2016/0380770 | A1 * | 12/2016 | Whitmer | H04L 9/0643 713/181 |
| 2016/0380772 | A1 * | 12/2016 | Gopal | H04L 9/3242 713/170 |
| 2017/0232300 | A1 * | 8/2017 | Tran | H04L 67/12 434/247 |
| 2018/0191503 | A1 * | 7/2018 | Alwar | G06Q 20/065 |
| 2018/0240107 | A1 * | 8/2018 | Andrade | G06Q 20/36 |

OTHER PUBLICATIONS

EP17767229.2 , "Extended European Search Report", dated Feb. 18, 2019, 6 pages.

* cited by examiner

VALIDATION CRYPTOGRAM FOR TRANSACTION

CROSS REFERENCE TO RELATED APPLICATIONS

This application is a non-provisional application of and claims the benefit of the filing date of U.S. Provisional Application No. 62/308,788, filed on Mar. 15, 2016, which is herein incorporated by reference in its entirety for all purposes.

BACKGROUND

Peer-to-peer transactions allow individuals to directly exchange information and value. Peer-to-peer transactions can be enabled by intermediary applications, such as a digital wallet provider.

For example, Alice can activate a digital wallet application on her mobile device and activate a peer-to-peer transaction function. Alice inputs her account credentials, and indicates that she would like to send a payment to Bob by inputting Bob's phone number. When Alice submits the transaction, Alice's mobile device sends her credentials to the digital wallet provider, along with the transaction amount and Bob's phone number. The digital wallet provider then contacts Bob at his mobile device, asking for his credentials. Bob inputs his credentials, and his mobile device sends his credentials back to the digital wallet provider. Having obtained both Alice's credentials and Bob's credentials, the digital wallet provider can cause the transaction to take place, such that the payment value is transferred from Alice's account to Bob's account.

While peer-to-peer transactions enable individuals to send value to one another, peer-to-peer transactions create a number of security issues. For example, a fraudster can execute a man-in-the-middle attack by intercepting a transaction message, changing some of the information, and then forwarding along the change transaction message.

As an example, the fraudster can intercept Alice's message to the digital wallet provider. The fraudster can change the message so that Bob is no longer indicated as the transaction recipient, and instead the fraudster is the recipient (e.g., by changing Bob's phone number to the fraudster's phone number). As a result, the digital wallet provider contacts the fraudster at his mobile device (instead of Bob), and the fraudster inputs his own account credentials. Then, the payment is sent to the fraudster instead of Bob.

As another example, the fraudster can intercept Bob's message to the digital wallet provider. The fraudster can change the message so that Bob's credentials are no longer listed, and instead the fraudster's credentials are listed. Again, the payment is sent to the fraudster instead of Bob.

Embodiments of the invention address these and other problems individually and collectively.

SUMMARY

Embodiments of the invention are directed to processing an interaction between a first party and a second party. The first party may provide account information as well as a cryptogram for verifying the first party is legitimately participating. The second party may agree to the interaction, and the second party may also provide account information and a cryptogram for verifying the second party is legitimately participating. A coordination computer may aggregate the first party and second party information, create a digital signature, and send the information to an interaction processing computer. The interaction processing computer can then verify the first party cryptogram, the second party cryptogram, and the digital signature, thereby validate that each entity agreed to the interaction and interaction details have not been altered.

Embodiments of the invention further allow a cryptogram to be generated using information about both the first party and the second party. As a result, both the first party account and the second party account can be validated through a single cryptogram.

One embodiment of the invention is directed to a method. The method comprises receiving, by a server computer, an interaction request including interaction details and a first cryptogram. The interaction details include receiver information, and the first cryptogram was generated using the receiver information. The method also includes verifying the first cryptogram. The method further comprises coordinating a transfer from a sender to a receiver.

Another embodiment of the invention is directed to a server computer configured to perform the above-described method. In some embodiments, the server computer can be an interaction processing computer.

Another embodiment of the invention is directed to a method comprising receiving, by a first computer, interaction details and a first cryptogram. The interaction details include receiver information, and the first cryptogram was generated using the receiver information. The method also includes sending an interaction confirmation request to a receiver device associated with the receiver information, and receiving an interaction confirmation response from the receiver device. The method further comprises sending an interaction request including the interaction details and the first cryptogram to a second computer. The second computer verifies the first cryptogram and coordinates a transfer from a sender to a receiver.

Another embodiment of the invention is directed to a first computer configured to perform the above-described method. In some embodiments, the first computer can be a coordination computer.

Further details regarding embodiments of the invention can be found in the Detailed Description and the Figures.

DETAILED DESCRIPTION

Figure 1:
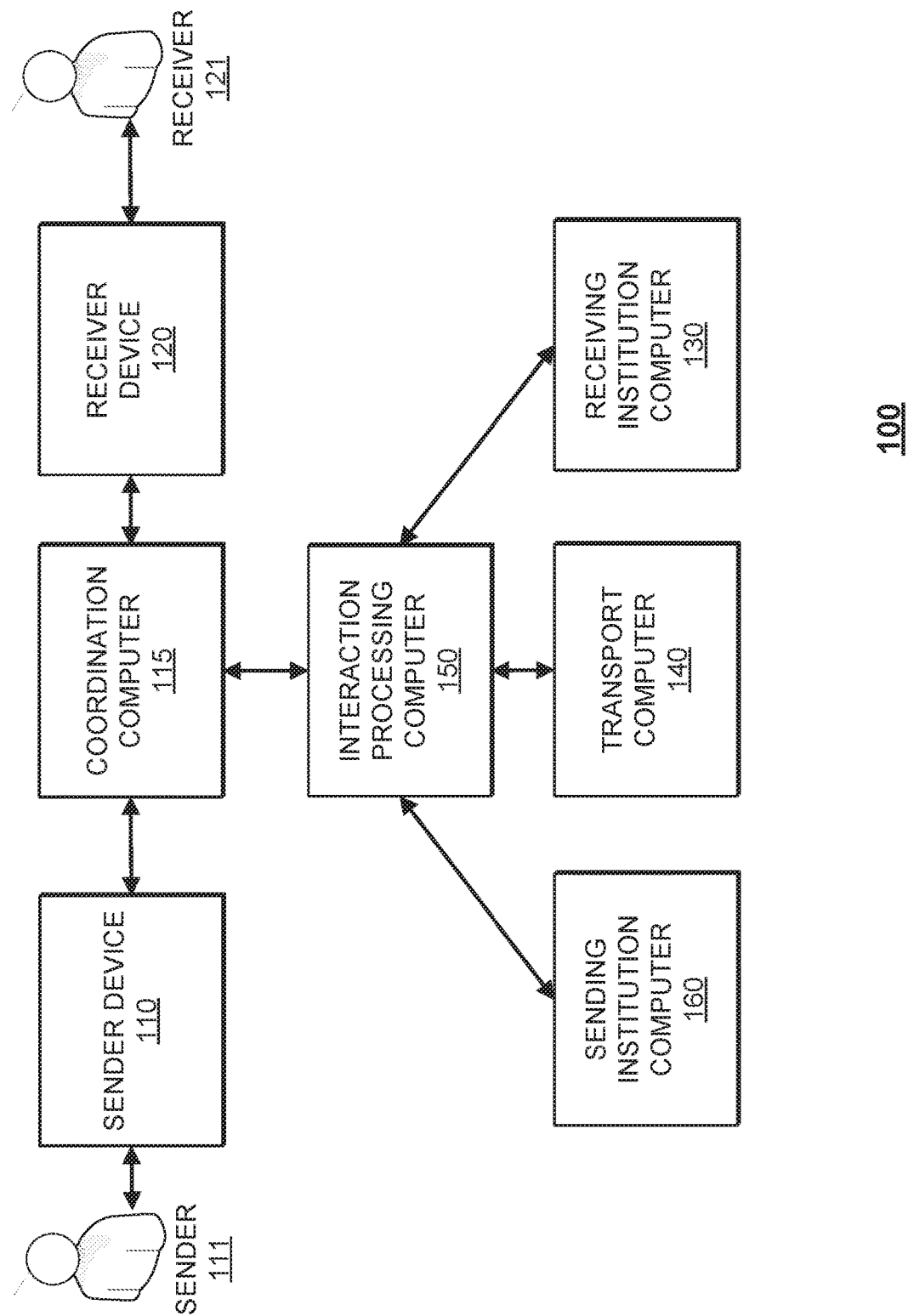
FIG. 1 shows a block diagram of a system according to an embodiment of the invention.

Embodiments of the present invention are directed preventing man-in-the-middle attacks, replay attacks, and other fraudulent interactions. Embodiments can prevent these fraudulent interactions by validating the authenticity of an interaction and interaction parameters. A first party (e.g., a "sender") can initiate, via a first device (e.g., a "sender device"), an interaction for sending value to a second party (referred to as a "receiver"). The sender can initiate an interaction by selecting a value to send, selecting an account from which to obtain the value, and by indicating a receiver for receiving the value. The sender device can then generate a cryptogram for the interaction. The cryptogram can be generated using a sender-associated cryptographic key, information identifying the sender, and information identifying the receiver.

When the interaction request is sent to an interaction processing computer, the interaction processing computer can verify that the cryptogram is authentic using a corresponding cryptographic key, sender-identifying information included in the interaction details, and receiver-identifying information included in the interaction details. If the cryptogram is successfully verified, the interaction processing computer validates that the sender legitimately requested the interaction, and that the information about the sender and receiver in the interaction details has not been altered (e.g., by a man-in-the-middle attack).

Accordingly, the cryptogram goes beyond validating that the sender initiated the interaction (as can take place in some interactions). Embodiments allow the cryptogram to further validate that the sender-chosen receiver has not been changed.

In some embodiments, the sender-identifying information and/or receiver-identifying information can include account identifiers or account tokens. Thus, the interaction processing computer can validate that the accounts from which to withdraw and deposit the interaction value have not been changed.

Embodiments of the invention also allow a receiver cryptogram to be created and verified. A receiver device can agree to an interaction by providing account information (e.g., a token), and by generating and providing a second cryptogram. The interaction processing computer can verify this cryptogram in addition to the first cryptogram from the sender device. As a result, the interaction processing computer can validate that the receiver agreed to the same interaction details as the sender. Thus, it can be validated that the same interaction parameters were agreed to by both the sender and receiver, and that the interaction details were not changed during messaging between the sender, receiver, and/or interaction processing computer.

Embodiments of the invention apply to any suitable interaction for any suitable type of value. For example, embodiments allow a sender to transfer property rights, access codes and passwords, event tickets, secure documents and data, monetary funds, and/or any other suitable value from a sender account to a receiver account.

Prior to discussing specific embodiments of the invention, some terms may be described in detail.

An "interaction" may include a communication, contact, or exchange between parties, devices, and/or entities. Example interactions include a transaction between two parties and a data exchange between two devices.

An "interaction request" may be an attempt to initiate a communication, contact, or exchange. An interaction request can include a message sent to an interaction processing entity. An interaction request can include any suitable information for executing an interaction, such as interaction details, verification information (e.g., one or more cryptograms), and any other suitable information. An example of an interaction request can be a transaction request.

"Interaction details" may include information associated with a communication, contact, or exchange. Interaction details can indicate different entities that are party to an interaction as well as value or information being exchanged. Interaction details can include a value, information associated with a sender (e.g., a token or account information, an alias, a device identifier, a contact address, etc.), information associated with a receiver (e.g., a token or account information, an alias, a device identifier, a contact address, etc.), one-time values (e.g., a random value, a nonce, a timestamp, a counter, etc.), and/or any other suitable information. An example of interaction details can be transaction details.

A "cryptographic key" may refer to a piece of information that is used in a cryptographic algorithm to transform input data into another representation. Cryptographic keys may include symmetric and asymmetric keys. A cryptographic algorithm can be an encryption algorithm that transforms original data (e.g., plaintext) into an alternate representation (e.g., cipher text), or a decryption algorithm that transforms encrypted information (e.g., cipher text) back to the original data (e.g., plaintext). Examples of cryptographic algorithms may include triple data encryption standard (TDES), data encryption standard (DES), advanced encryption standard (AES), etc.

A "cryptogram" may include encrypted information (e.g., cipher text). For example, a cryptogram can be a value that is the result of data elements entered into a cryptographic algorithm and then encrypted. A cryptogram can be used to validate data integrity. A cryptogram generated using a symmetric key can be decrypted using the same symmetric key. A cryptogram generated using a public key can be verified using a corresponding private key.

The term "public/private key pair" may include a pair of linked cryptographic keys generated by an entity. The public key may be used for public functions such as encrypting a message to send to the entity or for verifying a digital signature which was supposedly made by the entity. The private key, on the other hand may be used for private functions such as decrypting a received message or applying a digital signature. A public key may be authorized by a body known as a Certification Authority (CA) which stores the public key in a database and distributes it to any other entity which requests it. A private key may typically be kept in a secure storage medium and may usually only be known to the entity. However, the cryptographic systems described herein may feature key recovery mechanisms for recovering lost keys and avoiding data loss. Public and private keys may be in any suitable format, including those based on RSA or elliptic curve cryptography (ECC).

A "digital signature" or "signature" may refer to the result of applying an algorithm based on a public/private key pair. A digital signature can allow a signing party to manifest, and a verifying party to verify, the authenticity and integrity of a message, a document, or other information. The signing party acts by means of the private key and the verifying party acts by means of the public key. This process certifies the authenticity of the sender, the integrity of the signed message and the so-called principle of nonrepudiation, which does not allow disowning what has been signed. A message, document, certificate, or other data that includes a digital signature by a signing party is said to be "signed" by the signing party.

"Receiver information" may include data associated with a recipient. Receiver information can identify a receiver, a receiver device, a receiver account, or anything else associated with a receiver. For example, receiver information can include a phone number, an email address, a mobile device identifier, an account number, a token, a name, an alias, or any other suitable information.

"Sender information" may include data associated with a provider. Sender information can identify a sender, a sender device, a sender account, or anything else associated with a sender. For example, sender information can include a phone number, an email address, a mobile device identifier, an account number, a token, a name, an alias, or any other suitable information.

An "alias" may include an identifier used to indicate a person or entity that is also known by a more familiar name. For example, an alias can be a title, a name, a phrase, a code, a tag, or other indicator that identifies a person, organization, device, or account. An alias may be a secondary name that can be used in place of a primary name, or false name used to protect one's identity. In some embodiments, an alias can be associated with a context or circumstance. For example, an alias can be a name associated with an individual within a certain network.

A "device identifier" may comprise any suitable information that serves to identify a device. Examples of a device identifier include a MSISDN, a phone number, an SMS text address, an IP address, or any other information that may be used to identify a mobile device. In some embodiments, a device identifier can include a unique device number, such as an international mobile station equipment identity (IMEI) number, a unique serial number (i.e., integrated circuit card identifier (ICCI)) of a subscriber identification module (SIM) card, or a unique international mobile subscriber identity (IMSI).

An "interaction confirmation request" may include a message for asking for interaction acceptance. For example, an interaction confirmation request can be sent to inquire whether an entity (e.g., a receiver) would like to proceed with an interaction. An interaction confirmation request can include interaction details, such as a value, information about a sender, information about a receiver, and/or any other suitable information. An example of an interaction confirmation request can be a transaction confirmation request.

An "interaction confirmation response" may include a message indicating whether an interaction is accepted. For example, an interaction confirmation request can be sent to respond to an interaction confirmation request, and the message can indicate whether an entity (e.g., a receiver) has agreed to proceed with an interaction. An interaction confirmation response can include interaction details, such as a value, information about a sender, information about a receiver, and/or any other suitable information. An example of an interaction confirmation response can be a transaction confirmation response.

"Payment credentials" may include any suitable information associated with an account (e.g., a payment account and/or payment device associated with the account). Such information may be directly related to the account or may be derived from information related to the account. Examples of payment credentials may include a PAN (primary account number or "account number"), user name, expiration date, and verification values such as CVV (card verification value), dCVV (dynamic card verification value), CVV2 (card verification value 2), CVC3 card verification values, etc. An example of a PAN is a 16-digit number, such as "4147 0900 0000 1234."

A "digital wallet" can include an electronic device that allows an individual to conduct electronic commerce transactions. A digital wallet may store user profile information, payment credentials, bank account information, one or more digital wallet identifiers and/or the like and can be used in a variety of transactions, such as but not limited to eCommerce, social networks, money transfer/personal payments, mobile commerce, proximity payments, gaming, and/or the like for retail purchases, digital goods purchases, utility payments, purchasing games or gaming credits from gaming websites, transferring funds between users, and/or the like. A digital wallet may be designed to streamline the purchase and payment process. A digital wallet may allow the user to load one or more payment cards onto the digital wallet so as to make a payment without having to enter an account number or present a physical card.

A "token" may be a substitute value for a credential. A token may be a string of numbers, letters, or any other suitable characters. Examples of tokens include payment tokens, access tokens, personal identification tokens, etc.

A "payment token" may include an identifier for a payment account that is a substitute for an account identifier, such as a primary account number (PAN). For example, a token may include a series of alphanumeric characters that may be used as a substitute for an original account identifier. For example, a token "4900 0000 0000 0001" may be used in place of a PAN "4147 0900 0000 1234." In some embodiments, a token may be "format preserving" and may have a numeric format that conforms to the account identifiers used in existing transaction processing networks (e.g., ISO 8583 financial transaction message format). In some embodiments, a token may be used in place of a PAN to initiate, authorize, settle or resolve a payment transaction or represent the original credential in other systems where the original credential would typically be provided. In some embodiments, a token value may be generated such that the recovery of the original PAN or other account identifier from the token value may not be computationally derived. Further, in some embodiments, the token format may be configured to allow the entity receiving the token to identify it as a token and recognize the entity that issued the token.

A "server computer" may include a powerful computer or cluster of computers. For example, the server computer can be a large mainframe, a minicomputer cluster, or a group of servers functioning as a unit. In one example, the server computer may be a database server coupled to a Web server. The server computer may be coupled to a database and may include any hardware, software, other logic, or combination of the preceding for servicing the requests from one or more client computers.

FIG. 1 shows a system 100 comprising a number of components. The system 100 comprises a sender device 110 operated by a sender 111, as well as a receiver device 120 operated by a receiver 121. The system 100 further comprises a coordination computer 115, an interaction processing computer 150, a sending institution computer 160, a receiving institution computer 130, and a transport computer 140, each of which may be embodied by one or more computers. The sender device 110, the receiver device 120, the coordination computer 115, the interaction processing computer 150, the sending institution computer 160, the receiving institution computer 130, and the transport computer 140 may all be in operative communication with each other through any suitable communication channel or communications network. Suitable communications networks may be any one and/or the combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a Wireless Application Protocol (WAP), I-mode, and/or the like); and/or the like.

Messages between the computers, networks, and devices may be transmitted using a secure communications protocols such as, but not limited to, File Transfer Protocol (FTP);

HyperText Transfer Protocol (HTTP); Secure Hypertext Transfer Protocol (HTTPS), Secure Socket Layer (SSL), ISO (e.g., ISO 8583) and/or the like.

In the system 100, the sender 111 and the receiver 121 can each be an individual, an organization, or any other suitable entity associated with an account. The sender 111 can initiate an interaction between the sender 111 and the receiver 121, such that a value can be transferred from the sender's account at the sending institution computer 160 to the receiver's account at the receiving institution computer 130.

Any suitable type of interaction can take place for transferring any suitable type of value. For example, the sender 111 can transfer monetary funds to the receiver 121 (e.g., via a monetary transaction). As other examples, the sender can transfer access credentials (e.g., passcodes and cryptographic keys), digital files, event tickets, etc.

In one embodiment, the sender 111 and receiver 121 may be individuals and friends, and the sender 111 may send monetary value as a gift, or may reimburse the receiver 121 for an expense. In another scenario, the sender 111 can be a consumer, and the receiver 121 can be a merchant that engages in transactions and sells goods or services, or provides access to goods or services. In this case, the sender 111 may send monetary value in exchange for goods or services provided by the receiver 121.

The sender 111 can use the sender device 110 to initiate an interaction. The sender device 110 can then provide interaction details to the coordination computer 115, which can in turn obtain additional interaction data from the receiver device 120. In some embodiments, the sender device 110 and/or the receiver device 120 can also provide cryptograms for interaction validation. The coordination computer 115 can then send all of the interaction details to the interaction processing computer 150, which can then facilitate a value transfer from the sender's account at the sending institution computer 160 to the receiver's account at the receiving institution computer 130.

Figure 2:
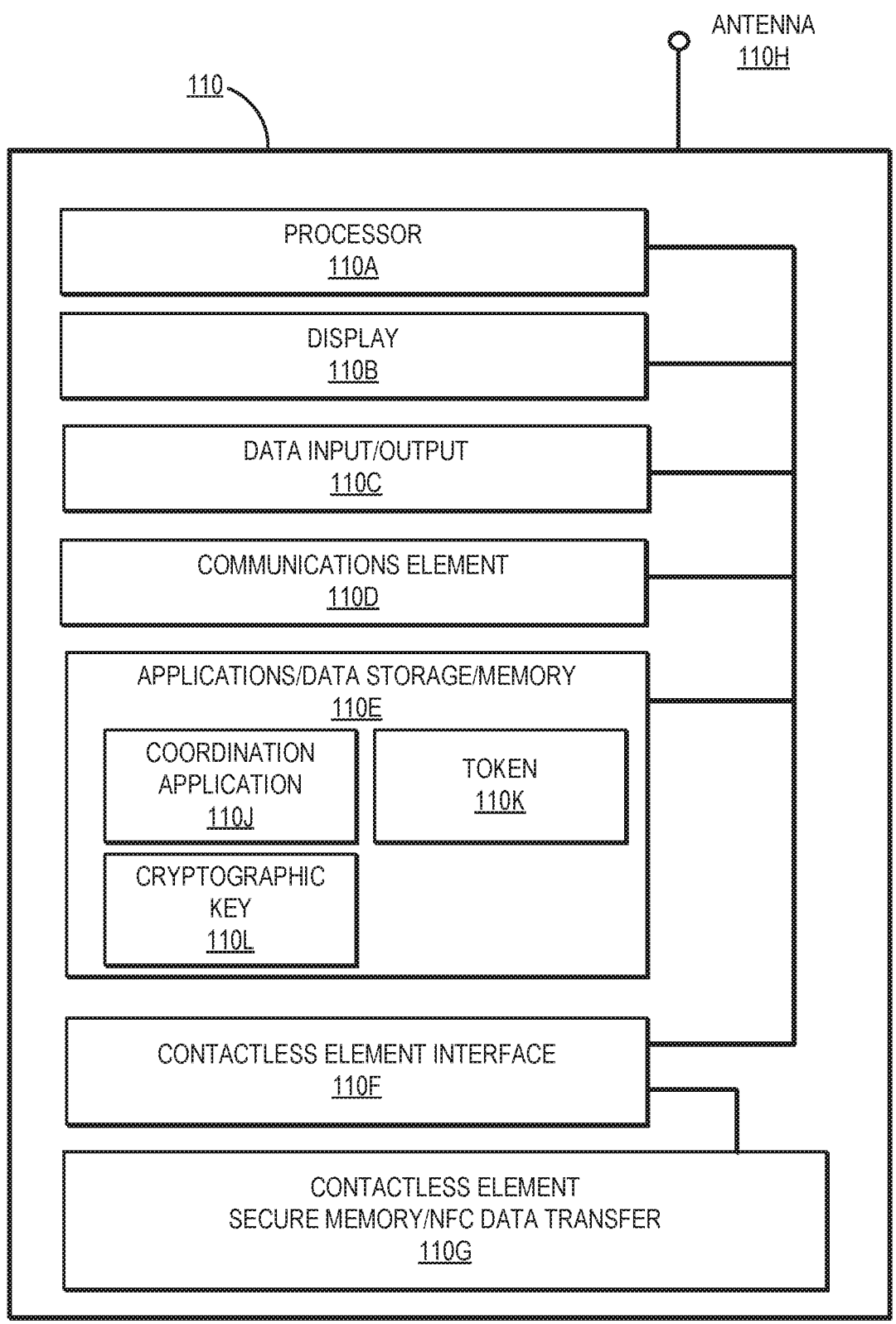
FIG. 2 shows a block diagram of an exemplary mobile device according to an embodiment of the invention.

The sender device 110 and receiver device 120 can each be a mobile device, a laptop or desktop computer, or any other suitable type of user device. An example of the sender device 110 in the form of a mobile device, according to some embodiments of the invention, is shown in FIG. 2. In some embodiments, the receiver device 120 can take a similar form. The sender device 110 may include circuitry that is used to enable certain device functions, such as telephony. The functional elements responsible for enabling those functions may include a processor 110A that can execute instructions that implement the functions and operations of the device. Processor 110A may access memory 110E (or another suitable data storage region or element) to retrieve instructions or data used in executing the instructions, such as provisioning scripts and mobile applications. Data input/output elements 110C, such as a keyboard or touchscreen, may be used to enable a user to operate the sender device 110 and input data (e.g., user authentication data). Data input/output elements may also be configured to output data (via a speaker, for example). Display 110B may also be used to output data to a user. Communications element 110D may be used to enable data transfer between sender device 110 and a wired or wireless network (via antenna 110H, for example) to assist in connectivity to the Internet or other network, and enabling data transfer functions. Sender device 110 may also include contactless element interface 110F to enable data transfer between contactless element 110G and other elements of the device, where contactless element 110G may include a secure memory and a near field communications data transfer element (or another form of short range communications technology). As noted, a cellular phone or similar device is an example of a sender device 110 that may be used in accordance with embodiments of the present invention. However, other forms or types of devices may be used without departing from the underlying concepts of the invention. For example, the sender device 110 may alternatively be in the form of a payment card, a key fob, a tablet computer, a wearable device, a vehicle such as a car, etc.

The memory 110E may comprise a coordination application 110J, a token 110K, a cryptographic key 110L, and any other suitable module or data. In some embodiments, one or more of these modules or data may be stored in a secure memory. The sender device 110 may have any number of mobile applications installed or stored on the memory 110E and is not limited to that shown in FIG. 2.

The cryptographic key 110L may be a symmetric key in some embodiments. In some embodiments, the cryptographic key 110L may have been provided by the coordination computer 115, the interaction processing computer 150, or any other suitable entity. For example, the interaction processing computer 150 may have provided the cryptographic key 110L and/or token 110K during installation or personalization of the coordination application 110L, or at any other suitable time. The cryptographic key 110L may be unique to the sender device 110. Accordingly, the sender device 110 can use the cryptographic key 110L to send data such that only the coordination computer 115 or the interaction processing computer 150 can view the data. Similarly, the receiver device 120 can also have a cryptographic key (which may be different from the sender device's key and unique to the receiver device 120).

In some embodiments, the sender device 110 may store information associated with the sender 111 and/or the sender's account. For example, the memory 110E may include the token 110K. The token 110K may be a surrogate account identifier that can be used in place of the normal account credentials. The memory 110E can also include other account information or personal information, such as account credentials, a name, an address, an email address, a phone number, an alias, or any other suitable sender 111 identification information. Similarly, the receiver device 120 can store information associated with the receiver 121 and/or the receiver's account, such as a receiver token associated with the receiver's account.

The coordination application 110J may, in conjunction with the processor 110A, provide a user interface for the sender 111 to provide input and initiate, facilitate, and manage interactions using the sender device 110. Through the coordination application 110J, the sender 111 can select a value to transfer, select an account from which to draw the value, and indicate a receiver. The sender 111 may input a receiver contact address (e.g., a phone number or email address), input a receiver name or alias, select the receiver 121 from a list of known contacts, or otherwise identify the intended receiver 121. The coordination application 110J can then send an interaction request with the selected interaction details to the coordination computer 115.

The coordination application 110J can, in conjunction with the processor 110A, store and/or access the token 110K, as well as other account credentials and sender information. Accordingly, the coordination application 110J can send the token 110K to the coordination computer 115 when initiating an interaction. In some embodiments, the token 110K may be stored at a secure element in the sender device 110.

The coordination application 110J can also generate a cryptogram for an interaction. In some embodiments, cryptogram generation can take place in a secure element or other secure memory of the sender device 110. A secure element can be a tamper-resistant platform (e.g., a one chip secure microcontroller) capable of securely hosting applications, as well as their confidential and cryptographic data.

In some embodiments, the sender device 110 may prompt the sender 111 to provide authentication information before allowing access to the coordination application 110J, before allowing an interaction to be initiated, before using the token 110K, before generating a cryptogram, or at any other suitable time. For example, user-authentication may be used to gain access to a secure element. User authentication can include a PIN, password, bio-authentication inputs (e.g., fingerprint, voice sample, or eye scan), or any other suitable information that can identity an individual.

The sender cryptogram can be generated using a cryptographic key and any suitable cryptographic algorithm. In addition to the cryptographic key, the sender cryptogram can be generated using several pieces of information. For example, inputs for generating the sender cryptogram can include transaction details, such as the information about the value being transferred (e.g., a payment amount) and sender account information (e.g., the token 110K). Further inputs can include a nonce (which may be generated at the time of interaction initiation), a random number, a timestamp, counter, and/or any other suitable information.

In some embodiments, the sender cryptogram can be used to verifiably associate additional sender information with the interaction. For example, additional inputs for the sender cryptogram can include information about the sender 111, such as sender contact information (e.g., a phone number or email address), a sender alias, a sender device ID, and/or the sender's digital wallet identifier.

Similarly, in some embodiments, additional receiver information can be verifiably associated with the interaction through the sender cryptogram. For example, additional inputs for the sender cryptogram can include information about the receiver 121, such as a receiver name or alias, a receiver contact address (e.g., an email address or a phone number), and/or receiver account information (e.g., a receiver token). Some or all of the sender-identifying information and receiver-identifying can be hashed before being included in the interaction request or being used as cryptogram inputs.

As a result, the sender cryptogram can serve to tie together the different data fields in the interaction request. For example, in some embodiments, the sender cryptogram can prove that the sender 111 authorized the interaction, as the sender cryptogram may be generated using a cryptographic key and token 110K in the secure element (which may only be accessed by user-authentication). The sender cryptogram can also prove that a certain sender account was chosen for the current interaction. In further embodiments, the sender cryptogram can prove that the interaction value is intended for a specific receiver, as the sender cryptogram can be generated using the intended receiver's information (e.g., an alias, contact address, token, account number, device identifier, wallet identifier, etc.).

As mentioned above, the receiver device 120 can also take the form of the mobile device shown in FIG. 2. The receiver device 120 can have similar functionality as described above for the sender device 110. The receiver device 120 can also include a cryptographic key (e.g., a symmetric key uniquely for communications between the receiver device 120 and the interaction processing computer 150), a token, and a coordination application.

The coordination application at the receiver device 120 may provide a user interface for receiving a notification about an initiated interaction and accepting the interaction. The receiver 121 may be able to select an option for acknowledging and agreeing to the interaction. The receiver 121 may also be able to indicate an account for receiving the transfer value.

The coordination application at the receiver device 120 can also generate a cryptogram. This receiver cryptogram can be a second cryptogram for validating the interaction details in addition to the first cryptogram from the sender. The receiver cryptogram can be generated using one or more same or different values as the sender cryptogram. For example, the receiver cryptogram can be generated using a receiver cryptographic key, the information about the value being transferred (e.g., a payment amount) and receiver account information (e.g., a receiver token). Further inputs can include a nonce (which may be generated at the time of interaction initiation), a random number, a timestamp, and/or any other suitable information.

In some embodiments, the receiver cryptogram can be used to verifiably associate additional receiver information with the interaction. For example, additional inputs for the cryptogram can include information about the receiver 121, such as receiver contact information (e.g., a phone number or email address), a receiver device ID, a receiver alias, and/or the receiver's digital wallet identifier.

Similarly, in some embodiments, additional sender information can be verifiably associated with the interaction through the receiver cryptogram. For example, additional inputs for the receiver cryptogram can include information about the sender 111, such as sender information that was provided via the interaction notification. The sender information can include a sender alias, a sender contact address (e.g., an email address or a phone number), and/or sender account information (e.g., a sender token). Some or all of the sender-identifying information and receiver-identifying can be hashed before being included in the interaction request or being used as cryptogram inputs.

As a result, the receiver cryptogram can serve to tie together the different data fields in the interaction request, as well as information associated with the receiver's interaction acceptance. For example, in some embodiments, the receiver cryptogram can prove that the receiver accepted the transfer, as the receiver cryptogram may be generated using a cryptographic key and token in the secure element (e.g., which may only be accessed by user-authentication). The receiver cryptogram can also prove that a certain receiving account was chosen for accepting the transfer value. In further embodiments, the cryptogram can prove that the transfer value was sent by a specific sender, as the cryptogram can be generated using the sender's information (e.g., an alias, contact address, token, account number, device identifier, wallet identifier, etc.).

Accordingly, two different cryptograms can be used to validate that the interaction taking place is one that was agreed upon. Both cryptograms can be generated using similar information, showing that both the sender and receiver agreed to the same interaction details.

Referring back to FIG. 1, the coordination computer 115 can coordinate the initiation of the interaction between the sender 111 and the receiver 121. The coordination computer 115 may be able to obtain information for processing the interaction from both the sender 111 and receiver 121, and then provide this interaction information to the interaction processing computer 150 for executing the interaction.

Figure 3:
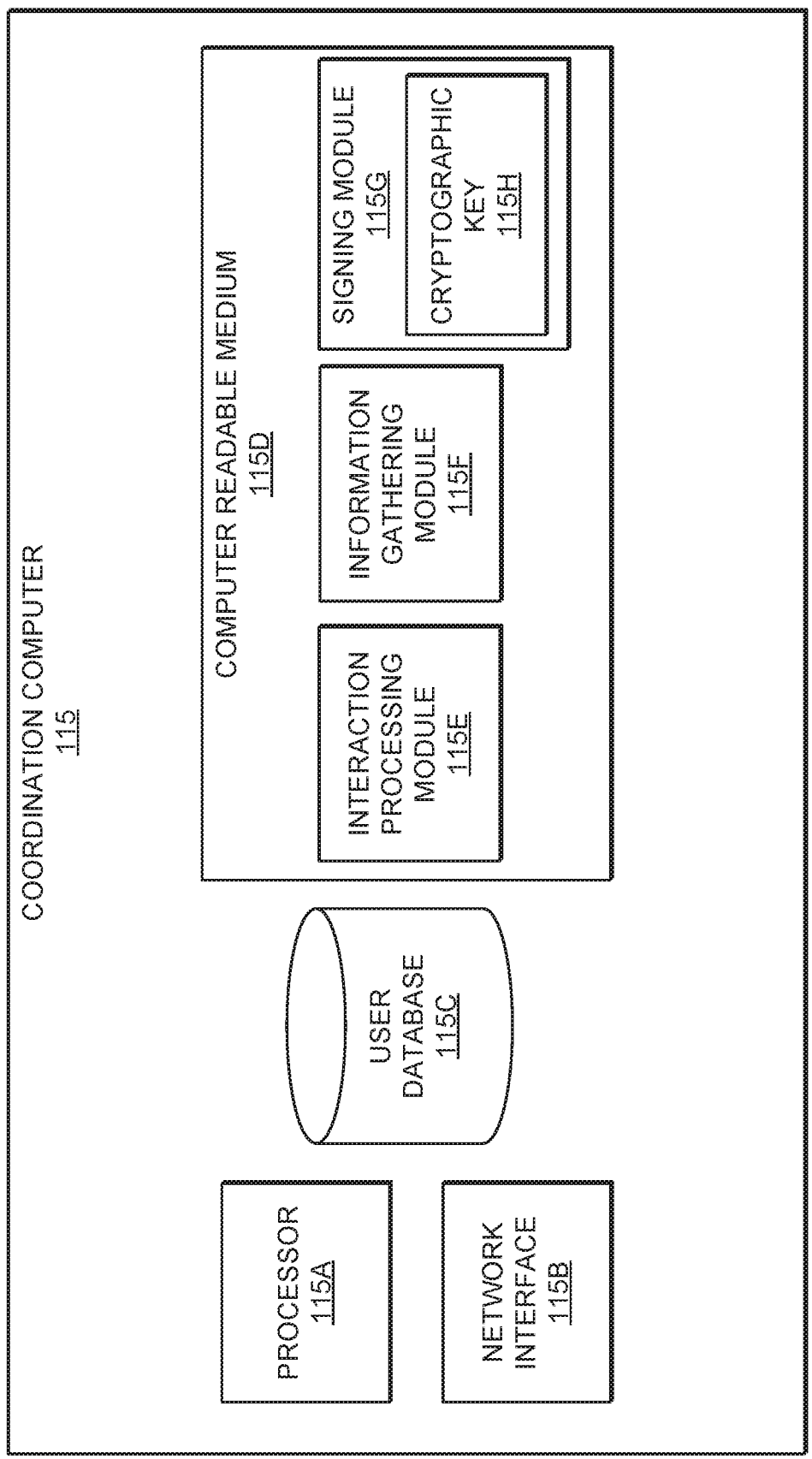
FIG. 3 shows a block diagram of a coordination computer according to an embodiment of the invention.

An example of the coordination computer 115, according to some embodiments of the invention, is shown in FIG. 3. The coordination computer 115 comprises a processor 115A, a network interface 115B, a user database 115C, and a computer readable medium 115D.

The computer readable medium 115D may comprise an interaction processing module 115E, an information gathering module 115F, a signing module 115G, and any other suitable software module. The computer readable medium 115D may also comprise code, executable by the processor 115A for implementing a method comprising receiving interaction details and a first cryptogram, the interaction details including receiver information, wherein the first cryptogram was generated using the receiver information; sending an interaction confirmation request to a receiver device associated with the receiver information; receiving an interaction confirmation response from the receiver device; and sending, to a second computer, an interaction request including the interaction details and the first cryptogram, wherein the second computer verifies the first cryptogram and coordinates a transfer from a sender to a receiver.

The interaction processing module 115E may comprise code that causes the processor 115A to process interactions. For example, the interaction processing module 115E may contain logic that causes the processor 115A to identify interaction details received from a sender device 110 and/or a receiver device 120 for an interaction. The interaction processing module 115E may also include instructions for creating an interaction request and sending the interaction request to the interaction processing computer 150. The interaction request can include interaction details, such as information about a sender account and a receiver account, information about an interaction value, contact information for the sender and receiver, and any other suitable information. The interaction request can also include one or more cryptograms.

The information gathering module 115F may comprise code that causes the processor 115A to obtain interaction details for an interaction. For example, the information gathering module 115F may contain logic that causes the processor 115A to contact a receiver device 120 for receiver account information, a receiver cryptogram, and any other suitable information that may be used for interaction processing. The instructions may cause the processor 115A to contact the receiver device 120 after a sender device 110 initiates an interaction and indicates a certain receiver 121 or receiver device 120.

The signing module 115G may comprise code that causes the processor 115A to create a digital signature for an interaction. For example, the signing module 115G may contain logic that causes the processor 115A to use a cryptographic key 115H (e.g., a private key), any suitable cryptographic algorithm, and some or all interaction details to generate a digital signature for the interaction.

In some embodiments, the coordination computer 115 may be able to verify cryptograms received from the sender device 110 and/or receiver device 120. Instructions and additional keys for this verification can be included in the signing module 115G, or in a separate validation module.

The user database 115C may store information about one or more senders and receivers. In some embodiments, the user database 115C may associate a user's alias with certain contact information. For example, the receiver 121 may be associated with a certain alias (e.g., the title "Wally72"). The sender 111 can indicate a desire to send a value to this alias, and the coordination computer 115 can identify the alias in the user database 115C. Then the coordination computer 115 can determine contact information (e.g., a phone number or email address) associated with this alias in the user database 115C, such that the coordination computer 115 can contact the receiver device 120 to obtain additional interaction details.

In some embodiments, the user database 115C may store account information about one or more senders and receivers. For example, the user database 115C may store a sender token and/or a receiver token. As a result, when an interaction is initiated, the sender device 110 and/or receiver device 120 may not have to send account information to the coordination computer 115. Instead, the coordination computer can identify their tokens in the user database 115C (e.g., based on an alias, a device identifier, a wallet identifier, or other user-identifying information).

In some embodiments, the coordination computer 115 can be a digital wallet computer. A digital wallet computer can store information about user payment accounts, as well as coordinate monetary transfers. In this scenario, the coordination applications at the sender device 110 and receiver device 120 can be digital wallet applications through which senders and receivers can initiate payment transactions.

In further embodiments, the coordination applications at the sender device 110 and receiver device 120 can send interaction details directly to the interaction processing computer 150. The interaction processing computer 150 or the sender device 110 can gather interaction details in place of the coordination computer 115. As a result, the coordination computer 115 can be removed from the system 100.

The interaction processing computer 150 may be disposed between the sending institution computer 160 and the receiving institution computer 130. The interaction processing computer 150 may include data processing subsystems, networks, and operations used to support and deliver authorization services, exception file services, and clearing and settlement services. For example, the interaction processing computer 150 may comprise a server coupled to a network interface (e.g., by an external communication interface), and databases of information. In some embodiments, the interaction processing computer 150 may be a transaction processing computer. Further, a the transaction processing computer may be representative of a transaction processing network. An exemplary transaction processing network may include VisaNet™. Transaction processing networks such as VisaNet™ are able to process credit card transactions, debit card transactions, and other types of commercial transactions. VisaNet™, in particular, includes a VIP system (Visa Integrated Payments system) which processes authorization requests and a Base II system which performs clearing and settlement services. The interaction processing computer 150 may use any suitable wired or wireless network, including the Internet.

Figure 4:
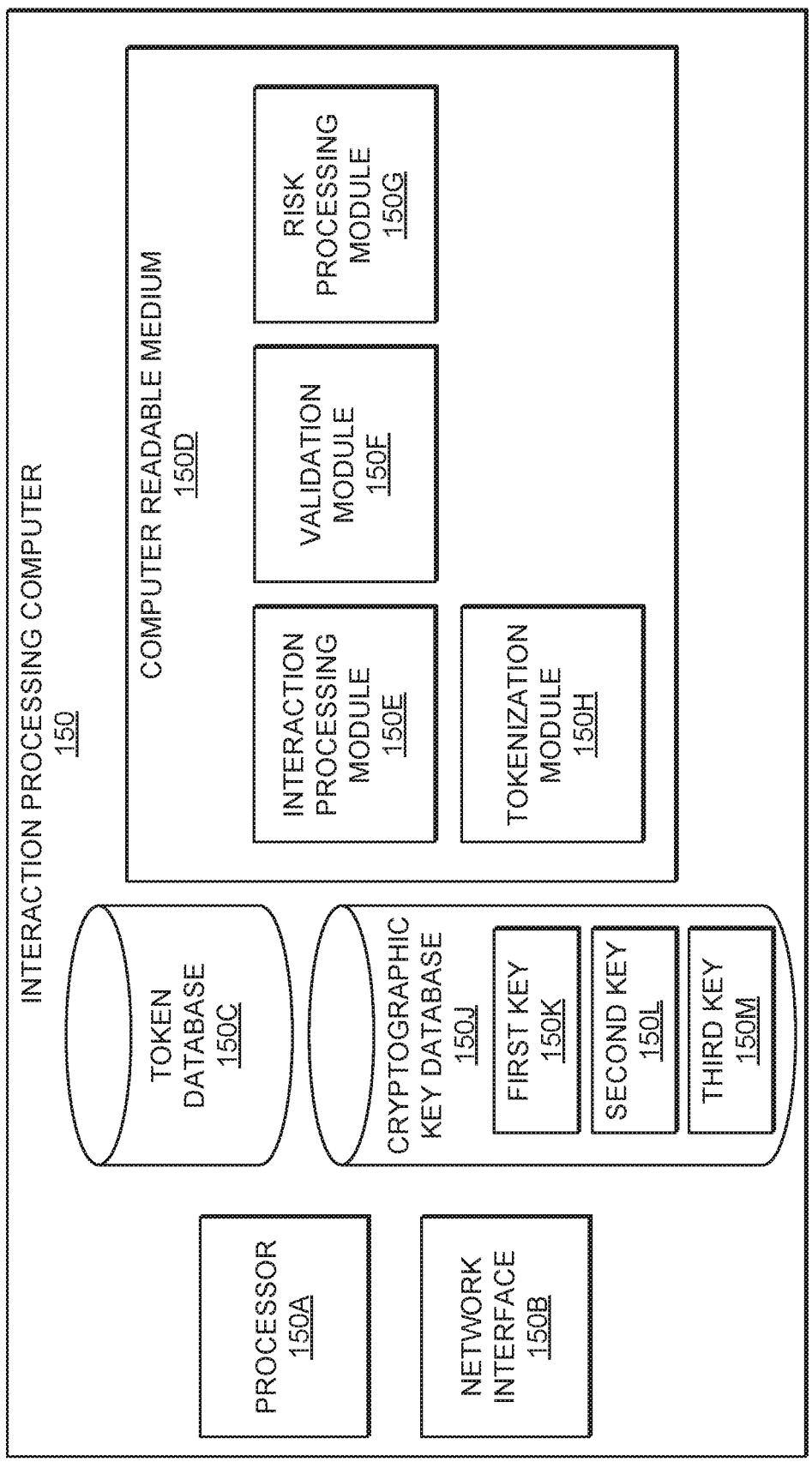
FIG. 4 shows a block diagram of an interaction processing computer according to an embodiment of the invention.

An example of the interaction processing computer 150, according to some embodiments of the invention, is shown in FIG. 4. The interaction processing computer 150 comprises a processor 150A, a network interface 150B, a token database 150C, a cryptographic key database 150J, and a computer readable medium 150D.

The computer readable medium 150D may comprise interaction processing module 150E, a validation module 150F, a risk processing module 150G, a tokenization module 150H, and any other suitable software module. The computer readable medium 150D may also comprise code, executable by the processor 150A for implementing a method comprising receiving an interaction request including interaction details and a first cryptogram, the interaction details including receiver information, wherein the first cryptogram was generated using the receiver information; verifying the first cryptogram; and coordinating a transfer from a sender to a receiver.

The token database 150C may include information about one or more tokens. For example, the token database 150C can have a token records that indicate how different tokens are associated with different sets of payment credentials or other account identifiers. In some embodiments, a token record may include additional information about a user or account associated with a token. For example, a token may be associated with a certain contact address (e.g., phone number or email address), alias, device identifier, institution, or any other suitable information. Some or all of this information may be hashed in the token record. In some embodiments, token records can instead be stored at a third party token database, or at any other suitable location.

The cryptographic key database 150J may include information about one or more cryptographic keys. For example, the cryptographic key database 150J can include cryptographic keys associated one or more user devices, secure elements, digital wallets, coordination computers, and/or any other suitable entities. The cryptographic key database 150J can include a first key 150K associated with the sender device 110. The first key 150K can be a symmetric key that is only shared with the sender device 110. Additionally, the cryptographic key database 150J can include a second key 150L associated with the receiver device 120. The second key 150L can be a symmetric key that is only shared with the receiver device 110. Further, the cryptographic key database 150J can include a third key 150M associated with the coordination computer 115. The third key 150M can be a public key that corresponds to a private key at the coordination computer 115. In some embodiments, the cryptographic key database 150J can include information associated with each key for identifying the key when appropriate. For example, the cryptographic key database 150J can store information about the sender device 110 and/or receiver device 120, such as device identifiers, digital wallet identifiers, contact addresses, tokens, names, aliases, or any other suitable information for recognizing a user and/or device. Some or all of this information may be hashed in the key record. In some embodiments, key records can instead be stored at a third party key database, or at any other suitable location.

The interaction processing module 150E may comprise code that causes the processor 150A to process interactions. For example, the interaction processing module 150E may contain logic that causes the processor 150A to receive an interaction request and orchestrate a transfer of value from a sender account to a receiver account based on the interaction request. In some embodiments, the interaction processing module 150E may include instructions for orchestrating a transaction by sending an AFT ("account funding transaction") message to the sending institution computer 160 and an OCT ("original credit transaction") message to the receiving institution computer 130.

The validation module 150F may comprise code that causes the processor 150A to validate an interaction request. For example, the validation module 150F may contain logic that causes the processor 150A to verify one or more cryptograms associated with an interaction, such as a sender cryptogram and/or a receiver cryptogram. The validation module 150F may also include instructions for verifying a digital signature from the coordination computer 115. The validation module 150F may include any suitable cryptographic algorithms in embodiments of the invention. Suitable data cryptographic algorithms may include DES, triple DES, AES, etc. It may also store or access (e.g., at the cryptographic key database 150J) cryptographic keys that can be used with cryptographic algorithms. Symmetric and/or asymmetric encryption techniques can be used.

In some embodiments, a sender cryptogram can be verified by recreating the sender cryptogram using some or all of the interaction details (e.g., the same types of information used at the sender device 110 to create the sender cryptogram), a cryptographic key associated with the sender device 110 (e.g., the first key 150K), and any suitable cryptographic algorithm (e.g., the same algorithm used at the sender device 110 to create the sender cryptogram). If the recreated cryptogram matches the received cryptogram, the sender cryptogram can be consider verified, and the interaction details thereby validated. In alternative embodiments, the sender cryptogram can be verified by decrypting the sender cryptogram using a cryptographic key associated with the sender device 110 (e.g., the first key 150K). The decrypted information can then be compared with the received interaction details, and if there is a match, the sender cryptogram can be consider verified, and the interaction details thereby validated. Similar verification methods and a cryptographic key associated with the receiver device 120 (e.g., the second key 150L) can be used to verify the receiver cryptogram.

In some embodiments, the digital signature from the coordination computer 115 can be verified using a cryptographic key associated with the coordination computer 115 (e.g., the third key 150M) and any suitable verification algorithm.

In other embodiments, the sender cryptogram and/or receiver cryptogram can instead be digital signatures. Also, the coordination computer's digital signature can instead be a cryptogram. In any of these scenarios, appropriate types of cryptographic keys and verification methods can be used, as described above for cryptograms and digital signatures. For example, if the sender cryptogram and/or receiver cryptogram are instead digital signatures, the sender device 110 and/or receiver device 120 can store private keys instead of symmetric keys, and the interaction processing computer 150 can store corresponding public keys.

In some of the embodiments, both a sender cryptogram and a receiver cryptogram can be generated based on both sender-identifying information and receiver-identifying information. Accordingly, both the cryptograms may indicate that the interaction is between a certain sender 111 and receiver 121. If both cryptograms are verified as being associated with the same sender and receiver, the interaction processing computer 150 can be confident that both the sender 111 and receiver 121 agreed to the same interaction, and no details have been fraudulently changed during interaction-related messaging.

The validation module 150F may further include instructions that cause the processor 150A to validate that the sender token and receiver token are being used appropriately. For example, the instructions may include checking that an interaction request involving a certain token is also accompanied by a certain contact address (e.g., phone number or email address), alias, and/or device identifier associated with that token, as indicated by token records in the token database 150C.

The risk processing module 150G may comprise code that causes the processor 150A to analyze interaction risk. For example, the risk processing module 150G may contain logic that causes the processor 150A to analyze interaction velocity, value or amount thresholds, and other possible risk indicators. A risk score can be created and used to evaluate whether or not to authorize a transaction.

The tokenization module 150H may comprise code that causes the processor 150A to tokenize and de-tokenize account identifiers. For example, the tokenization module 150H may contain logic that causes the processor 150A to receive a token, identify a matching stored token, determine an account identifier or other payment credentials associated with the matching stored token, and then provide or utilize the account identifier.

Referring back to FIG. 1, the sending institution computer 160 may be associated with a sending institution, which may be an entity that sends a value. The sent value may be withdrawn from a sender's account. An example of a sending institution may be an issuer, which may typically refer to a business entity (e.g., a bank) that maintains an account for a user (e.g., the sender). An issuer may also issue and manage an account (e.g., a payment account) associated with the sender device 110.

The receiving institution computer 130 may be associated with a receiving institution, which may be an entity that can receive a value. The received value can be credited to a receiver's account. An example of a receiving institution may be an acquirer, which may typically be a business entity (e.g., a commercial bank) that has a business relationship with a particular receiver (e.g., a merchant) or other entity. The receiving institution computer 130 can also be an issuer in some embodiments.

The transport computer 140 may be an intermediary institution or account. In some embodiments, an interaction value transferred from the sending institution computer 160 may first go to the transport computer 140. Then, the value can be transferred from the transport computer 140 to the receiving institution computer 130. In some embodiments, the transport computer 140 can be an acquirer or acquirer processor.

The interaction processing computer 150, sending institution computer 160, the receiving institution computer 130, and the transport computer 140 may operate suitable routing tables to route authorization request messages and/or authorization response messages using payment credentials, merchant identifiers, or other account identifiers.

Figure 5:
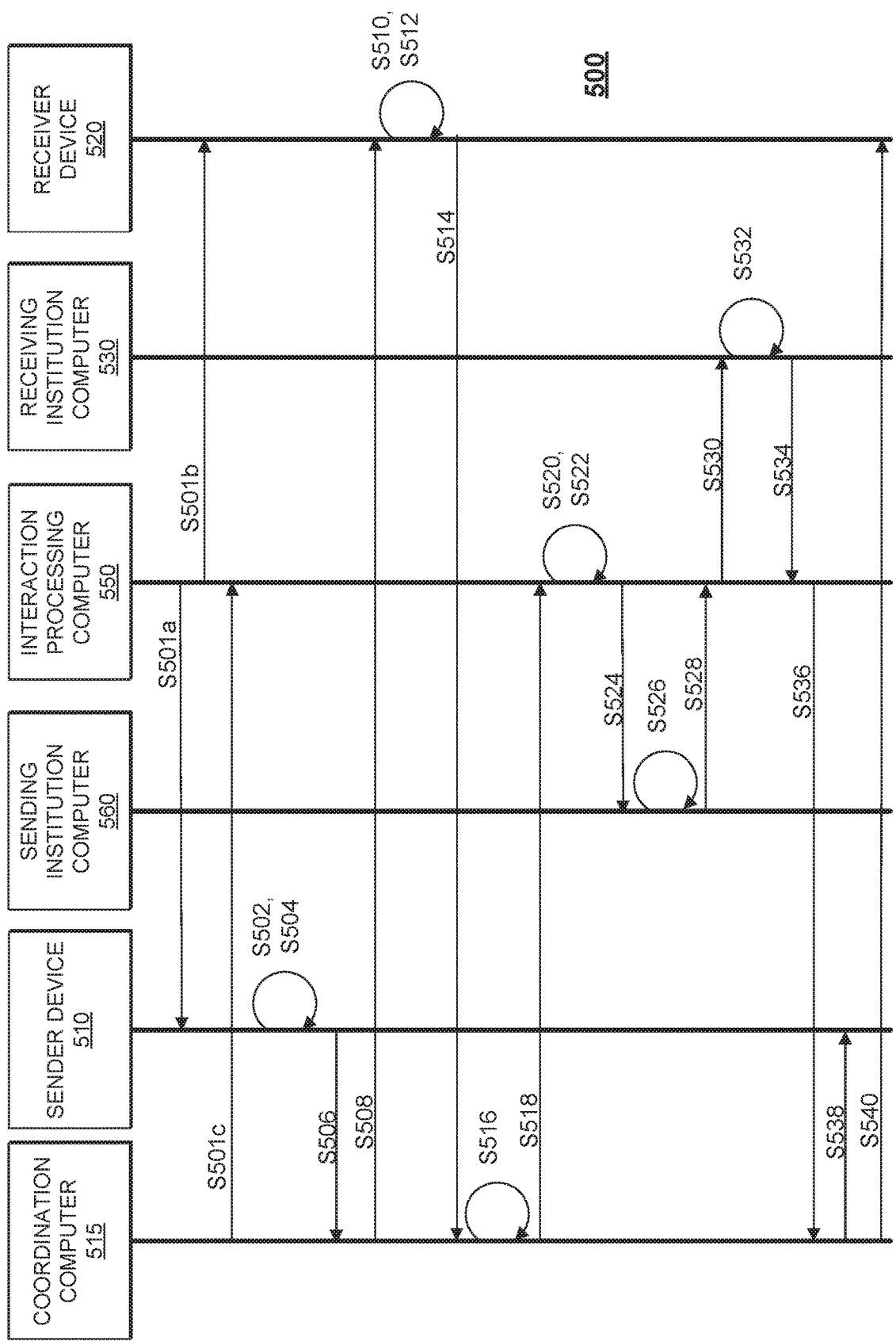
FIG. 5 shows a flow diagram illustrating a method for processing an interaction, according to embodiments of the invention.

A method 500 according to embodiments of the invention can be described with respect to FIG. 5. Some elements in other Figures are also referred to. The steps shown in the method 500 may be performed sequentially or in any suitable order in embodiments of the invention. In some embodiments, one or more of the steps may be optional.

The various messages described below may use any suitable form of communication. In some embodiments, a request or response may be in an electronic message format, such as an e-mail, a short messaging service (SMS) message, a multimedia messaging service (MMS) message, a hypertext transfer protocol (HTTP) request message, a transmission control protocol (TCP) packet, a web form submission. The request or response may be directed to any suitable location, such as an e-mail address, a telephone number, an internet protocol (IP) address, or a uniform resource locator (URL). In some embodiments, a request or response may comprise a mix of different message types, such as both email and SMS messages.

The following method describes a transaction for transferring monetary funds from a first party to a second party. However, as explained above, embodiments allow any suitable sort of interaction to take place, and embodiments allow a first party to transfer any suitable type of value to a second party during. For example, secure data, access credentials, event tickets, login codes and passwords, monetary funds, and any other suitable data, value, or object can change possession by moving from a first account to a second account.

Before the transaction is initiated, one or more cryptographic keys may be distributed. For example, at step S501a, the interaction processing computer 550 may provide a first key (e.g., a symmetric key) to the sender device 510. The sender device 510 may store the first key (e.g., in a secure element), and the interaction processing computer 550 may also store a copy of the first key. In some embodiments, this key may be provided along with a token during a token provisioning and/or application personalization process.

At step S501b, the interaction processing computer 550 may provide a second key (e.g., a symmetric key) to the receiver device 520. The receiver device 520 may store the second key (e.g., in a secure element), and the interaction processing computer 550 may also store a copy of the second key. In some embodiments, this key may be provided along with a token during a token provisioning and/or application personalization process.

At step S501c, the interaction processing computer 550 may receive a third key (e.g., a public key) from the coordination computer 515. The third key may be a public key that corresponds to a private key at the coordination computer 515. The interaction processing computer 550 may store the third key.

At a later time, a first party (referred to as a sender) may desire to send a payment to a second party (referred to as a receiver). For example, the sender may intend to pay the receiver for one or more goods or services, or to send a gift.

At step S502, the sender may activate a coordination application (which may be a digital wallet application) on the sender device 510. To login to the coordination application and/or enable the payment functionality at the sender device 510, the sender may provide authentication information. For example, the sender may enter a PIN or password, or provide bio-authentication information such as a fingerprint or eye scan.

Having accessed the coordination application, the sender may select an option for sending a payment. The sender may also provide information about the payment, such as a payment amount and a sender account from which to draw the funds. For example, the sender can select an account associated with the sender's digital wallet, or provide information for a new account. In some embodiments, a default account can be automatically selected and used (e.g., based on the sender's digital wallet or device identifier).

The sender may also provide information identifying the receiver and/or a receiver account. For example, the sender can input a receiver name or alias, receiver contact information (e.g., an email address or a phone number), or a receiver token.

At step S504, the sender device 510 may obtain a payment token associated with the selected account for the transaction. For example, the sender device 510 may retrieve a payment token stored in a secure element of the sender device 510 (which may involve additional user-authentication). Alternatively, the sender device 510 may request (e.g., over-the-air) a payment token from a token provider computer.

Additionally, the sender device 510 may generate a cryptogram for the payment. The cryptogram can be generated using a cryptographic key (e.g., a symmetric key), any suitable cryptographic algorithm, and one or more transaction-related details. For example, inputs for generating the cryptogram can include the payment amount, the sender payment token, a nonce (which may be generated at the time of transaction initiation), a random number, a timestamp, a counter, and/or any other suitable information. Further inputs for the cryptogram can include information about the sender, such as the sender's digital wallet identifier, a sender device ID, a sender name or alias, and/or sender contact information (e.g., a phone number or email address). In some embodiments, the cryptogram can further be generated using information about the receiver, such as a receiver name or alias, a receiver contact address (e.g., an email address or a phone number), and/or a receiver account identifier (e.g., a receiver token). Some or all of the user-identifying information can be hashed before being used as cryptogram inputs or otherwise included in the payment request.

At step S506, the coordination application may cause the sender device 510 to send a payment instruction and associated cryptogram to the coordination computer 515 (which may be a computer that provides digital wallet services). The payment instruction can include the sender token, the amount, the receiver-identifying information (e.g., an alias, contact information, a token, a wallet identifier, or a device identifier), and/or any other suitable information. Some or all of this information may be included as plain text. In some embodiments, the payment instruction can include additional information for verifying the cryptogram. For example, the payment instruction can include the timestamp, the nonce, the random number, as well as information about the sender such as the sender's digital wallet identifier, a sender device ID, and/or sender contact information (e.g., a phone number or email address), some or all of which can be hashed.

At step S508, having received the payment instruction, the coordination computer 515 can notify the receiver that a payment was initiated. The coordination computer 515 may identify information indicated in the payment instruction for contacting the receiver, such as a receiver phone number, email address, or digital wallet identifier. The coordination computer 515 may then send a transaction confirmation request to the receiver device 520 (e.g., via SMS message, email, wallet notification, etc.). The request may indicate the amount being transferred and information about the sender (e.g., a name, alias, phone number, etc.). The request may prompt the receiver device 520 to acknowledge acceptance of the transaction and to provide account information for receiving the transfer value.

At step S510, the receiver may activate a coordination application on the receiver device 520 and review the payment notification. The receiver may affirm that the payment should be accepted (e.g., by selecting an "accept" option). In order to accept, the receiver may be prompted to self-authenticate. The receiver may then proceed to enter a PIN or password, or provide bio-authentication information such as a fingerprint or eye scan.

The receiver may also provide information about an account that can be used for depositing the transfer value. In some embodiments, the receiver may select an account that is already associated with the receiver device 520 or digital wallet. Alternatively, the receiver can input a new account information.

At step S512, the receiver device 520 may obtain a payment token associated with the selected account. For example, the receiver device 520 may retrieve a payment token stored in a secure element of the receiver device 520. Alternatively, the receiver device 520 may request (e.g., over-the-air) a payment token from a token provider computer. In other embodiments, the real payment credential (e.g., which the payment token represents) can be obtained.

Additionally, the receiver device 520 may generate a cryptogram for the payment (e.g., at the secure element). The cryptogram can be generated using a cryptographic key (e.g., a symmetric key), any suitable cryptographic algorithm and one or more transaction-related details. For example, inputs for generating the cryptogram can include the receiver's payment token (or other account information), the payment amount, a nonce, a random number, a timestamp, and/or any other suitable information. The cryptogram can further be generated using information about the receiver, such as a receiver alias, a receiver contact address (e.g., an email address or a phone number), a wallet identifier, or a device identifier. Additional inputs for the cryptogram can include information about the sender, such as any sender information that was sent to the receiver device 520 by the digital wallet computer 515. This can include the sender's payment token, the sender's digital wallet identifier, a sender device ID, a sender alias, and/or sender contact information (e.g., a phone number or email address).

At step S514, the coordination application may cause the receiver device 520 to send a transaction confirmation response and the cryptogram to the coordination computer 515. The transaction confirmation response can include the receiver token, the amount, information identifying the receiver (e.g., an alias, contact information, a token, a wallet identifier, or a device identifier), information identifying the sender, and/or any other suitable information. In some embodiments, some or all of this information may be included as plain text. In some embodiments, some or all of the sender-identifying information and receiver-identifying information can be hashed before being included in the payment instruction or being used as cryptogram inputs. In some embodiments, the payment instruction can include additional information for verifying the cryptogram. For example, the payment instruction can include the timestamp, the nonce, and/or a random number.

The coordination computer 515 may now have a sender payment token, a receiver payment token, and an amount. The coordination computer 515 may also have information for validating the transaction details, such as a sender cryptogram, a receiver cryptogram, various identification information, and other transaction-associated data. Accordingly, the coordination computer 515 may have the necessary information for instructing the transfer.

At step S516, the coordination computer 515 may create a digital signature based on some or all of the information (or a hash of the information) received from the sender device 510 and receiver device 520. The digital signature may be generated using a coordination computer cryptographic key (e.g., a private key) and any suitable cryptographic algorithm.

At step S518, the coordination computer 515 may send the transfer instruction to the interaction processing computer 550. The instruction can include some or all of the data received from the sender device 510 and receiver device 520, as well as the digital signature. In some embodiments, the transfer instruction can include transaction details in plain text, and the cryptograms and digital signature as cipher text.

At step S520, the interaction processing computer 550 may validate that the information received from the coordination computer 515 is legitimate and was not altered by verifying the digital signature. The interaction processing computer 550 may determine a cryptographic key associated with the coordination computer 515 (e.g., based on a coordination computer identifier). For example, the interaction processing computer 550 may identify a third key (e.g., a public key that is associated with the coordination computer 515). The interaction processing computer 550 may the use the third key and any suitable verification algorithm to verify the digital signature.

The interaction processing computer 550 may also verify the sender cryptogram. For example, the interaction processing computer 550 may determine a cryptographic key associated with the sender device 510 (e.g., based on a sender information included in the transaction details). The interaction processing computer 550 may identify a first key (e.g., a symmetric key that is associated with the sender device 510), and may use this first key, some or all of the received transaction details, and any suitable cryptographic algorithm to verify the sender cryptogram. For example, the interaction processing computer 550 may use the first key and the received transaction details to recreate the cryptogram. If the second, recreated cryptogram matches the first, received cryptogram, the received cryptogram can be considered verified. Alternatively, the interaction processing computer 550 can decrypt the cryptogram (e.g., reverse the cryptographic algorithm used to generate the cryptogram) using the first key and determine whether transaction details from the decrypted cryptogram match the received transaction details. As a result, the interaction processing computer 550 can confirm that the sender legitimately requested the transaction, and that the received transaction details are the same transaction details specified by the sender.

Additionally, the interaction processing computer 550 may verify the receiver cryptogram. For example, the interaction processing computer 550 may determine a cryptographic key associated with the receiver device 520 (e.g., based on a receiver information included in the transaction details). The interaction processing computer 550 may identify a second key (e.g., a symmetric key that is associated with the receiver device 520), and may use this second key, some or all of the received transaction details, and any suitable cryptographic algorithm to verify the receiver cryptogram. For example, the interaction processing computer 550 may use the second key and the received transaction details to recreate the cryptogram. If the second, recreated cryptogram matches the first, received cryptogram, the received cryptogram can be considered verified. Alternatively, the interaction processing computer 550 can decrypt the cryptogram (e.g., reverse the cryptographic algorithm used to generate the cryptogram) using the second key and determine whether transaction details from the decrypted cryptogram match the received transaction details. As a result, the interaction processing computer 550 can confirm that the receiver legitimately agreed to the transaction, and that the received transaction details are the same transaction details seen by the receiver.

The interaction processing computer 550 may also perform screening and velocity checks, and any other suitable type of transaction risk analysis. For example, in some embodiments, the interaction processing computer 550 may validate that the transaction request includes other information associated with the sender token and/or receiver token, as indicated by records in a token database. For example, the interaction processing computer 550 may validate that transaction details include a contact address, device identifier, or other suitable information that matches a token database record.

If the validations of step S520 are successful, the interaction processing computer 550 may authorize the transaction, seek authorization from another entity, and/or otherwise proceed with transaction processing. In some embodiments, if one or more of the validations fail, the transaction may be rejected.

At step S522, the interaction processing computer 550 may de-tokenize the sender's payment token and/or the receiver's payment token. The interaction processing computer 550 can identify a set of sender payment credentials (e.g., a payment account number) associated with the sender's payment token. The interaction processing computer 550 can similarly obtain a set of receiver payment credentials associated with the receiver's payment token.

At steps S524-S534, the interaction processing computer 550 may coordinate the transfer of funds from the sender's account at the sending institution computer 560 to the receiver's account at the receiving instituting computer 530.

For example, at step S524, the interaction processing computer 550 can send a message to the sending institution computer 560 informing the sending institution computer 560 about the transfer. For example, the interaction processing computer 550 may provide information about the transfer amount, the sender account, the receiver account and bank, and any other suitable information. In some embodiments, the interaction processing computer 550 may use an AFT ("account funding transaction") message to instruct the sending institution computer 560 to authorize the transfer, hold the funds, and/or transmit the funds.

At step S526, the sending institution computer 560 may authorize the transaction, put a hold on the transfer funds, and/or transmit the transfer funds. The sending institution computer 560 may check that the sender's account has sufficient funds and perform other suitable risk processing activities. Then, the sender's account may be debited, and the transfer amount may be moved to a holding account or an intermediary bank such as a transport computer.

At step S528, the sending institution computer 560 may inform the interaction processing computer 550 that the transfer was authorized, and that the funds have been moved or otherwise reserved for the transfer.

At step S530, the interaction processing computer 550 can send a message to the receiving institution computer 530 informing the receiving institution computer 530 about the transfer. For example, the interaction processing computer 550 may provide information about the transfer amount, the sender's bank, the receiver's account, and any other suitable information. The interaction processing computer 550 may also inform the receiving institution computer 530 that the transfer was already authorized at the sending institution computer 560, such that the funds are guaranteed. In some embodiments, the interaction processing computer 550 may use an OCT ("original credit transaction") message to instruct the receiving institution computer 530 to credit the funds to the receiver's account.

At step S532, the receiving institution computer 530 may credit the transfer value to the receiver's account. As a result, the transferred funds may become available to the receiver. The receiving institution computer 530 may also perform any suitable risk processing activities.

At step S534, the receiving institution computer 530 may inform the interaction processing computer 550 that the receiver's account was successfully credited. In some embodiments, at a later time, the interaction processing computer 550 may coordinate a settlement and clearing process between the sending institution computer 560, the receiving institution computer 530, and/or the transport computer.

At step S536, the interaction processing computer 550 can then proceed to inform the coordination computer 515 that the transfer was successfully executed. Then, at step S538, the coordination computer 515 can notify the sender that the transfer was completed (e.g., by sending a message to a coordination application on the sender device 510). Additionally, at step S540, the coordination computer 515 can notify the receiver that the transfer was completed (e.g., by sending a message to a coordination application on the receiver device 520). In other embodiments, the sender and receiver can be notified directly by the interaction processing computer 550, the sending institution computer 560, and/or the receiving institution computer 530.

Embodiments of the invention include a number of alternatives for the above-described method. For example, in some embodiments, the coordination computer 515 may locally store a sender payment token and/or a receiver payment token. The sender and/or receiver may have an account (e.g., a digital wallet account) at the coordination computer 515, such that account information may not need be provided for each transaction. Instead, the coordination computer 515 can identify and utilize a payment token (or other account information) for each transaction based on sender and/or receiver identification information (e.g., an alias, phone number, device ID, wallet ID, etc.). In some embodiments, the default receiver token can be automatically used, and the receiver device 520 may not be contacted for transaction acceptance.

In some embodiments, the coordination computer 515 can verify cryptograms generated at the sender device and/or receiver device. In this scenario, the coordination computer 515 may have access to one or more keys associated with one or more devices. Additionally, in some embodiments, the sender cryptogram and/or the receiver cryptogram can instead be generated by the coordination computer 115. For example, the coordination computer may generate a sender cryptogram using a sender-associated cryptographic key, a sender token, and/or any other suitable information.

In further embodiments, the functions performed by the coordination computer 515 can instead be performed by the interaction processing computer 550, and the coordination computer 515 can be removed from the system.

As mentioned above, the sender cryptogram can be generated using receiver-associated information, such as a receiver alias or contact address. In further embodiments, the sender cryptogram can be generated using the receiver's account information, such as a token or payment account number. For example, the sender may input (e.g., manually type) the receiver's token when initiating the transaction, and the sender device may then have access to the receiver's token for generating the cryptogram.

In some embodiments, different cryptograms may be generated for different transaction processing networks. For example, a sender device may generate two cryptograms, a first cryptogram generated using a first key associated with a first transaction processing network, and a second cryptogram generated using a second key associated with a second transaction processing network. Additionally, the cryptograms can be generated without network-specific inputs. For example, sender and/or receiver associated information inputs can be an alias, contact address, or account identifier instead of a token. As a result, the transaction can be validated (e.g., using either the first or second cryptogram) regardless of whether the transaction is processed at the first or second network.

In addition to sender-initiated transactions, embodiments also allow for receiver-initiated transactions. For example, a receiver can select a receiving account, an amount, and a sender (e.g., using an alias, contact address, etc.). Then the coordination computer 515 can send a transaction confirmation request to the sender device 510. Accordingly, the sender can receive a request for a payment, and decide whether or not to approve of sending the payment. If approving, the sender can select a sending account. The method can proceed similarly as described above with respect to FIG. 5, with the receiver instead providing the initial information, and the sender accepting or rejecting the proposed transaction.

As described above for steps S524-S534, the interaction processing computer 550 can orchestrate the transfer of value from the sender's account at the sending institution computer 560 to the receiver's account at the receiving institution computer 530. A number of alternatives related to this transferring process can take place. For example, in some embodiments, steps S524-S528 can take place directly after step S506. In other words, as soon as the sender initiates the transaction, the coordination computer 515 and/or interaction processing computer 550 can inform the sending institution computer 560 about the transfer (e.g., by sending an AFT). As a result, the funds can be held, transferred, or otherwise obtained and ready at an earlier time. Then, once the receiver has accepted the transfer and provided account information, the funds can be sent to the receiving institution computer 530 (e.g., steps S530-S534 can take place). In some embodiments, if the receiver does not accept the transfer within a certain timeframe, the transaction can be cancelled and funds returned to the sender's account.

As explained above, in some embodiments the funds can initially be transferred from the sending institution computer 560 to an intermediary holding account at an intermediary bank (such as the transport computer in FIG. 1). Then, the funds can be transferred from the intermediary bank to the receiving institution computer 530. In other embodiments, instead of using an intermediary bank, one or more holding accounts can be used at the sending institution computer 560 or the receiving institution computer 530. For example, the funds can be debited from the sender's account and then moved to a holding account at the sending institution computer 560. Once the receiving institution computer 530 approves, the funds can be transferred to the receiving institution computer 530. The funds can be credited directly to the receiver's account, or they can first be received at another holding account at the receiving institution computer 530.

Embodiments of the invention have a number of advantages. For example, in embodiments of the invention, interaction security can be improved. One method for improving interaction security is generating a cryptogram that can validate a number of interaction details. For example, a sender cryptogram can be generated using a first cryptographic key and interaction details such as a sender token and a receiver alias (or other identifying information). This cryptogram can be verified by an interaction processing computer (or other suitable entity) using a corresponding cryptographic key and received interaction details. Successful cryptogram verification can indicate that the sender legitimately requested the interaction, as a secure element is not accessible (e.g., for accessing a payment token and generating an authentic cryptogram) unless the sender is authenticated at the sender device. The verification can also validate that the received interaction details are the same as the interaction details originally specified by the sender, and thus they have not been changed in transit (e.g., by a man-in-the-middle attack). Any interaction details used to generate the original cryptogram can be validated. For example, information about the sender (e.g., an alias, a token, an account, etc.), information about the receiver (e.g., an alias, a token, an account, etc.), an interaction value, and/or any other suitable information can be validated. The sender cryptogram can also be generated using one-time values (e.g., a nonce, a timestamp, counter, etc.), and thereby be used to validate that the an interaction request is unique (e.g., it is a not a replay attack).

Embodiments of the invention can further improve interaction security by introducing a receiver cryptogram. A receiver cryptogram can be generated using similar interaction details as a sender cryptogram. However, a receiver cryptogram can have more specific receiver-associated information, such as a receiver token or account identifier. Also, a receiver cryptogram can be generated using a receiver-associated cryptographic key. Accordingly, verifying a receiver cryptogram can indicate that the correct receiver legitimately accepted and approved of the interaction, as a secure element is not accessible (e.g., for accessing a payment token and generating an authentic cryptogram) unless the receiver is authenticated at the receiver device. The verification can also confirm that a receiver token (or other account information) in the interaction details has not been changed (e.g., by a man-in-the-middle attack).

Embodiments of the invention can further advantageously utilize multiple cryptograms together. For example, both a sender cryptogram and receiver cryptogram can be generated and verified for the same interaction. Both cryptograms can be generated and verified using the same or similar interaction details. As a result, an interaction processing computer can validate that both the sender and receiver agreed to the same interaction details, even though they conducted the interaction remotely via their respective devices. In other words, the sender and receiver have viewed the interaction details in different locations (e.g., physically separate regions) and at different times (e.g., the sender first initiates the interaction, and the receiver views and accepts the interaction at a later time). Cryptograms with agreeing interaction details can validate that the interaction details were not changed when transmitted between the sender device and the interaction processing computer, between the sender device and the receiver device, or between the receiver device and the interaction processing computer.

Embodiments of the invention can also improve interaction security by digitally signing the interaction details. A coordination computer that assembles interaction details received from the sender device and receiver device can create a digital signature based on the interaction details and a cryptographic key. An interaction processing computer that receives the interaction details in an interaction request from the coordination computer can then verify the digital signature using a corresponding cryptographic key. Accordingly, the interaction processing computer can be further confident that the interaction has not been altered since transmission from the coordination computer.

Embodiments of the invention advantageously allow interactions to take place without requiring that a coordination computer (e.g., a digital wallet computer) store and maintain tokens or other account information associated with the sender or receiver. This improves operational efficiency and reduces security risk at the coordination computer. Embodiments allow tokens to instead by managed at the sender device and receiver device. For example, a token can be retrieved from a secure memory at the sender device when an interaction is being conducted. The token can be sent along with an interaction request, but need not be stored by the coordination computer. Similarly, a receiver device can provide a token (or other account information) when prompted.

A computer system will now be described that may be used to implement any of the entities or components described herein. Subsystems in the computer system are interconnected via a system bus. Additional subsystems include a printer, a keyboard, a fixed disk, and a monitor which can be coupled to a display adapter. Peripherals and input/output (I/O) devices, which can couple to an I/O controller, can be connected to the computer system by any number of means known in the art, such as a serial port. For example, a serial port or external interface can be used to connect the computer apparatus to a wide area network such as the Internet, a mouse input device, or a scanner. The interconnection via system bus allows the central processor to communicate with each subsystem and to control the execution of instructions from system memory or the fixed disk, as well as the exchange of information between subsystems. The system memory and/or the fixed disk may embody a computer-readable medium.

As described, the inventive service may involve implementing one or more functions, processes, operations or method steps. In some embodiments, the functions, processes, operations or method steps may be implemented as a result of the execution of a set of instructions or software code by a suitably-programmed computing device, microprocessor, data processor, or the like. The set of instructions or software code may be stored in a memory or other form of data storage element which is accessed by the computing device, microprocessor, etc. In other embodiments, the functions, processes, operations or method steps may be implemented by firmware or a dedicated processor, integrated circuit, etc.

Any of the software components or functions described in this application may be implemented as software code to be executed by a processor using any suitable computer language such as, for example, Java, C++ or Perl using, for example, conventional or object-oriented techniques. The software code may be stored as a series of instructions, or commands on a computer-readable medium, such as a random access memory (RAM), a read-only memory (ROM), a magnetic medium such as a hard-drive or a floppy disk, or an optical medium such as a CD-ROM. Any such computer-readable medium may reside on or within a single computational apparatus, and may be present on or within different computational apparatuses within a system or network.

While certain exemplary embodiments have been described in detail and shown in the accompanying drawings, it is to be understood that such embodiments are merely illustrative of and not intended to be restrictive of the broad invention, and that this invention is not to be limited to the specific arrangements and constructions shown and described, since various other modifications may occur to those with ordinary skill in the art.

As used herein, the use of "a", "an" or "the" is intended to mean "at least one", unless specifically indicated to the contrary.

What is claimed is:

1. A method comprising:
   receiving, by a server computer from a sender device, a peer-to-peer interaction request including interaction details and a first cryptogram, the interaction details including receiver information for a receiver device with which the sender device is requesting an interaction, wherein the receiver information was not encrypted with a first key and was provided based on user input at the sender device, wherein the first cryptogram was generated at the sender device based on encrypting the receiver information with the first key;

recreating, by the server computer, the first cryptogram, wherein the first cryptogram is recreated by using the receiver information, from the interaction details received from the receiver device, that was not encrypted with the first key, a cryptographic key associated with the sender device, and an algorithm used at the sender device to create the first cryptogram;

determining, by the server computer, whether the recreated first cryptogram, that was recreated using the receiver information from the interaction details received from the receiver device, matches the received first cryptogram;

verifying, by the server computer, the first cryptogram after determining that the recreated first cryptogram, that was recreated using the receiver information from the interaction details received from the receiver device, matches the received first cryptogram;

authorizing, by the server computer, a peer-to-peer transfer from a sender account to a receiver account based on the verified first cryptogram; and coordinating, by the server computer, the peer-to-peer transfer from the sender account to the receiver account, wherein the peer-to-peer interaction request further includes a second cryptogram that was generated by the receiver device.

2. The method of claim 1, wherein the interaction details further include sender information, wherein the second cryptogram was generated using the sender information, and wherein the method further comprises:

verifying, by the server computer, the second cryptogram.

3. The method of claim 2, wherein the first cryptogram was generated further using the sender information, and wherein the second cryptogram was generated further using the receiver information, such that the first cryptogram and the second cryptogram were both generated using both the sender information and the receiver information.

4. The method of claim 2, the method further comprising:

determining, by the server computer, the first key associated with the sender device, wherein the first cryptogram is verified using the first key;

determining, by the server computer, a second key associated with the receiver device, wherein the second cryptogram is verified using the second key;

determining, by the server computer, a third key associated with a coordination computer, wherein the peer-to-peer interaction request includes a digital signature generated using the interaction details by the coordination computer; and verifying, by the server computer, the digital signature using the third key.

5. A server computer comprising:

a processor; and a computer readable medium, the computer readable medium comprising code, executable by the processor, for implementing a method comprising:

receiving, from a sender device, a peer-to-peer interaction request including interaction details and a first cryptogram, the interaction details including receiver information for a receiver device with which the sender device is requesting an interaction, wherein the receiver information was not encrypted with a first key and was provided based on user input at the sender device, wherein the first cryptogram was generated at the sender device based on encrypting the receiver information with the first key;

recreating the first cryptogram, wherein the first cryptogram is recreated by using the receiver information, from the interaction details received from the receiver device, that was not encrypted with the first key, a cryptographic key associated with the sender device, and an algorithm used at the sender device to create the first cryptogram;

determining whether the recreated first cryptogram, that was recreated using the receiver information from the interaction details received from the receiver device, matches the received first cryptogram;

verifying the first cryptogram after determining that the recreated first cryptogram, that was recreated using the receiver information from the interaction details received from the receiver device, matches the received first cryptogram; authorizing a peer-to-peer transfer from a sender account to a receiver account based on the verified first cryptogram; and coordinating the peer-to-peer transfer from the sender account to the receiver account, wherein the peer-to-peer interaction request further includes a second cryptogram that was generated by the receiver device.

6. The server computer of claim 5, wherein the interaction details further include sender information, wherein the second cryptogram was generated using the sender information, and wherein the method further comprises:

verifying the second cryptogram.

7. The server computer of claim 6, wherein the first cryptogram was generated further using the sender information, and wherein the second cryptogram was generated further using the receiver information, such that the first cryptogram and the second cryptogram were both generated using both the sender information and the receiver information.

8. The server computer of claim 6, the method further comprising:

determining the first key associated with the sender device, wherein the first cryptogram is verified using the first key;

determining a second key associated with the receiver device, wherein the second cryptogram is verified using the second key;

determining a third key associated with a coordination computer, wherein the peer-to-peer interaction request includes a digital signature generated using the interaction details by the coordination computer; and verifying the digital signature using the third key.

9. A method comprising:

receiving, by a first computer, interaction details and a first cryptogram for a peer-to-peer interaction, the interaction details including receiver information for a receiver device with which a sender device is requesting an interaction, wherein the receiver information was not encrypted with a first key and was provided based on user input at the sender device, wherein the first cryptogram was generated at the sender device based on encrypting the receiver information with the first key;

sending, by the first computer, an interaction confirmation request to the receiver device associated with the receiver information;

receiving, by the first computer, an interaction confirmation response from the receiver device; and sending, by the first computer, to a second computer, a peer-to-peer interaction request including the interaction details and the first cryptogram, wherein the second computer:
recreates the first cryptogram, wherein the first cryptogram is recreated by using the receiver information, from the interaction details received from the receiver device, that was not encrypted with the first key, a cryptographic key associated with the sender device, and an algorithm used at the sender device to create the first cryptogram;
determines whether the recreated first cryptogram, that was recreated using the receiver information from the interaction details received from the receiver device, matches the received first cryptogram;
verifies the first cryptogram after determining that the recreated first cryptogram, that was recreated using the receiver information from the interaction details received from the receiver device, matches the received first cryptogram authorizes a peer-to-peer transfer from a sender account to a receiver account based on the verified first cryptogram; and
coordinates a transfer from the sender account to the receiver account, wherein the interaction confirmation response further includes a second cryptogram generated by the receiver device using sender information.

10. The method of claim 9, wherein the interaction details further include the sender information, wherein the peer-to-peer interaction request sent to the second computer includes the second cryptogram, and wherein the second computer verifies the second cryptogram.

11. The method of claim 10, wherein the first cryptogram was generated further using the sender information, and wherein the second cryptogram was generated further using the receiver information, such that the first cryptogram and the second cryptogram were both generated using both the sender information and the receiver information.

12. The method of claim 10, further comprising:
generating, by the first computer, a digital signature using the interaction details, wherein the peer-to-peer interaction request includes the digital signature, wherein the second computer determines a third key associated with a coordination computer, wherein the second computer verifies the digital signature using the third key, wherein the second computer determines the first key associated with the sender device, wherein the second computer verifies the first cryptogram using the first key, wherein the second computer determines a second key associated with the receiver device, and wherein the second computer verifies the second cryptogram using the second key.

13. A first computer comprising:
a processor; and
a computer readable medium, the computer readable medium comprising code, executable by the processor, for implementing a method comprising:
receiving interaction details and a first cryptogram for a peer-to-peer interaction, the interaction details including receiver information for a receiver device with which a sender device is requesting an interaction, wherein the receiver information was not encrypted with a first key and was provided based on user input at the sender device, wherein the first cryptogram was generated at the sender device based on encrypting the receiver information with the first key;
sending an interaction confirmation request to the receiver device associated with the receiver information;
receiving an interaction confirmation response from the receiver device; and
sending, to a second computer, a peer-to-peer interaction request including the interaction details and the first cryptogram, wherein the second computer;
recreates the first cryptogram, wherein the first cryptogram is recreated by using the receiver information, from the interaction details received from the receiver device, that was not encrypted with the first key, a cryptographic key associated with the sender device, and an algorithm used at the sender device to create the first cryptogram;
determines whether the recreated first cryptogram, that was recreated using the receiver information from the interaction details received from the receiver device, matches the received first cryptogram;
verifies the first cryptogram after determining that the recreated first cryptogram, that was recreated using the receiver information from the interaction details received from the receiver device, matches the received first cryptogram;
authorizes a peer-to-peer transfer from a sender account to a receiver account based on the verified first cryptogram; and
coordinates a transfer from the sender account to the receiver account, wherein the interaction confirmation response further includes a second cryptogram generated by the receiver device using sender information.

14. The first computer of claim 13, wherein the interaction details further include the sender information, wherein the peer-to-peer interaction request sent to the second computer includes the second cryptogram, and wherein the second computer verifies the second cryptogram.

15. The first computer of claim 14, wherein the first cryptogram was generated further using the sender information, and wherein the second cryptogram was generated further using the receiver information, such that the first cryptogram and the second cryptogram were both generated using both the sender information and the receiver information.

16. The first computer of claim 14, further comprising:
generating a digital signature using the interaction details, wherein the peer-to-peer interaction request includes the digital signature, wherein the second computer determines a third key associated with a coordination computer, wherein the second computer verifies the digital signature using the third key, wherein the second computer determines the first key associated with the sender device, wherein the second computer verifies the first cryptogram using the first key, wherein the second computer determines a second key associated with the receiver device, and wherein the second computer verifies the second cryptogram using the second key.

* * * * *